April 9, 1957 L. T. SZADY 2,788,102
SPRAG FOR ONE-WAY CLUTCHES
Original Filed Feb. 5, 1951
FIG.2.
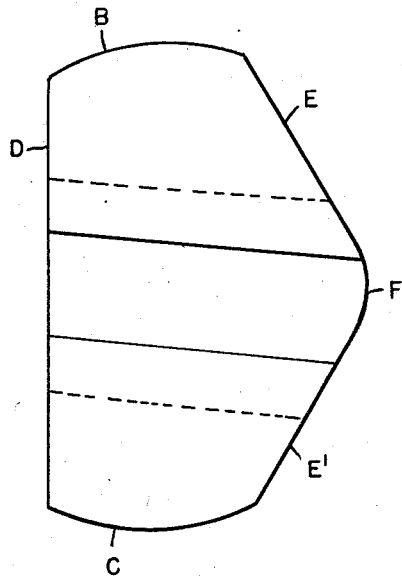
FIG.1.
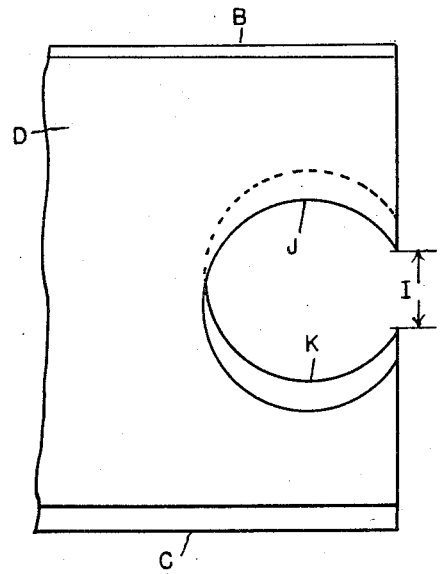
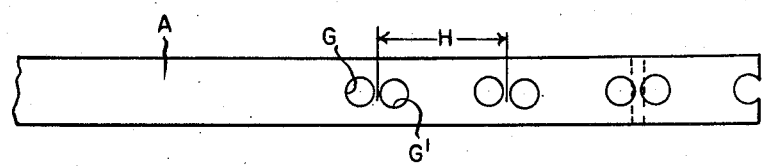
FIG.3.
*INVENTOR.*
LEOPOLD T. SZADY
BY
ATTORNEYS

2,788,102

SPRAG FOR ONE-WAY CLUTCHES

Leopold T. Szady, Grosse Pointe Woods, Mich., assignor to Formsprag Company, Van Dyke, Mich., a corporation of Michigan Original application February 5, 1951, Serial No. 209,355, now Patent No. 2,740,190, dated April 3, 1956. Divided and this application December 27, 1955, Serial No. 555,373

2 Claims. (Cl. 192—45.1)

The invention relates to one-way clutches of that type in which a series of separate sprags is interposed between radially spaced concentric raceways respectively on coaxial rotary driving and driven members. With such constructions it is necessary to individually energize the sprags to hold the same in frictional contact with the raceways. One means for this purpose is a garter spring engaging a bearing on each sprag at such an angle as to transmit a torque stress thereto. The spring may be biased either to contract or to expand in diameter with respect to said bearings but in either case it will impart sufficient torque to each sprag to energize the same. It is further necessary that the energizing garter springs should be retained in engagement with said bearings on the sprags, which may be accomplished by threading the spring through a transverse aperture in the sprag intermediate the ends thereof or by engaging the springs with notches in the opposite ends of the sprag. In the latter case the notch in each sprag must be inclined with respect to the longitudinal axis of the sprag as well as to the transverse axis thereof. If the garter spring is biased to expand in diameter, then the end slot in the sprag must incline radially outward from its entrance end. If the spring is biased to contract in diameter the notch must be inclined radially inward from its entrance end. However, in the commercial manufacture of such sprags, it is difficult to form both of these inclinations of the slot from the same entrance end.

The present application is a divisional of my earlier filed application Serial No. 209,355, filed February 5, 1951, now Patent No. 2,740,190, issued April 3, 1956, in which the claims have been restricted to the method, whereas in the present application they are directed to the structure.

It is the object of this invention to obtain a construction of sprag in which the slots for receiving the energizing springs have both of the inclinations above referred to, thereby forming retaining bearings for either a radially expanding or a radially contracting garter spring.

To this end the invention consists in the construction as hereinafter set forth.

In the accompanying drawings:

Fig. 1 is a side elevation of one end portion of a sprag of my improved construction.

Fig. 2 is an end elevation thereof.

Fig. 3 is an elevation of the stock bar prior to the severance of the same in sprag lengths but subsequent to the drilling of the holes therein which form the end notches in the severed sprags.

The essential characteristic of a sprag, which is arranged between spaced concentric raceways, is that the portions thereof which engage the respective raceways should be eccentric to each other in the plane of rotation of the clutch. One method of forming such sprags is to draw or extrude a bar having the desired cross sectional contour, which bar is then severed into sprag lengths. The end notches may be formed in the sprags after severing the same from the bar and usually after the heat treatment and quenching which hardens the sprags. Consequently, the notch-forming tool is usually a grinder wheel which can operate on the hardened metal. However, with such a tool the notch formed will have its opposite surfaces parallel to each other so that both must be inclined in the same direction with respect to the longitudinal axis of the sprag. With my improved method of forming the sprags, the drawn or extruded bar is transversely drilled prior to its severing into sprag lengths and prior to the hardening process. The holes so formed are spaced in such relation to each other that the severing of the bar (preferably by a rotary cutting tool) will intersect both holes of an adjacent pair so as to form entrance slots to each after severance. Furthermore, these entrance slots will be narrower than the full diameter of the bore and consequently will form opposite inclinations on the radially outward and radially inward sides thereof. If the energizing springs are engaged with each end of the sprags, then the bores formed before severance must be in closely spaced pairs which successively are spaced from each other by dimensions corresponding generally to the length of the sprags.

As illustrated, A is the drawn or extruded stock bar which is of a cross sectional contour including eccentric cam portions B and C diametrically opposite each other. The other portions of the contour may be varied but, as specifically shown, there is a side D which extends in a general radial direction with respect to the clutch and an opposite side formed of oppositely inclined portions E and E' having a rounded nose portion F therebetween. However, the shape of the latter side is not essential to the instant invention. The bar A is first advanced intermittently to a drilling machine (not shown) which forms therein pairs of adjacent bores G, G' spaced from each other by a dimension H equal to the length of the severed sprag plus the thickness of the cutting tool. At a further point in the advancement of the bar A, it is severed by a transverse cut of sufficient width to intersect both of the bores of each pair. This forms in the severed sprags end notches, each having an entrance slot of a width I which is less than the diameter of the bore. Consequently, the portion J of the bore on the radially outward side thereof (with respect to the position of the sprag in the clutch) inclines radially outward from the entrance slot to the central plane of the bore while the portion K on the radially inward side of the bore (with respect to the position of the sprag in the clutch) inclines radially inward from the entrance slot. The former will form a bearing for receiving an outwardly expanding garter spring and will retain the same from displacement. The other side forms a bearing for an inwardly contracting garter spring. It is, of course, to be understood that the direction of the bores with respect to the cross sectional contour of the bar is such that the garter springs engaging the respective bearings will each impart a torque to the sprag.

My improved construction has the advantage that the same sprags may be used for high speed rotation of the clutches or low speed rotation thereof. Thus, in the one case it may be desirable to use expanding garter springs and in the other contracting springs, but either type of spring will be retained from displacement by the inclination of the bearing from the entrance end.

While I have described one method of forming the notched bearings in the ends of the clutch members, my invention is equally applicable to sprags formed by other methods. The essential feature of the finished sprag is that it is formed with spring-engaging notches having bearing portions on the opposite side thereof radially, which are oppositely inclined to respectively retain outwardly expanding and radially contracting energizing springs.

What I claim as my invention is:

1. A sprag for one-way rotary clutches having a notched end for reception of an energizing garter spring, the notch being transversely inclined to form a bearing for the spring on one side of the center of turning of the sprag, and the radially outer and inner surfaces of the notch being undercut for alternative retention respectively of an expanding or a contracting garter spring.

2. The construction as in claim 1 in which the notch is formed by an inclined transverse bore which intersects the end of the sprag to form an entrance slot for the spring which is less in width than the diameter of the bore.

References Cited in the file of this patent

UNITED STATES PATENTS 2,486,603   King ------------------ Nov. 1, 1949